United States Patent
Sezgin et al.

(10) Patent No.: US 10,133,945 B2
(45) Date of Patent: Nov. 20, 2018

(54) SKETCH MISRECOGNITION CORRECTION SYSTEM BASED ON EYE GAZE MONITORING

(71) Applicant: KOC Universitesi, Sariyer, Istanbul (TR)

(72) Inventors: Tevfik Metin Sezgin, Istanbul (TR); Ozem Kalay, Istanbul (TR)

(73) Assignee: KOC Universitesi, Istanbul (TR)

( * ) Notice: Subject to any disclaimer, the term of this patent is extended or adjusted under 35 U.S.C. 154(b) by 0 days.

(21) Appl. No.: 15/694,555

(22) Filed: Sep. 1, 2017

(65) Prior Publication Data
US 2018/0025245 A1    Jan. 25, 2018

Related U.S. Application Data

(63) Continuation of application No. PCT/TR2015/000015, filed on Mar. 5, 2015.

(51) Int. Cl.
| | |
|---|---|
| *G06K 9/00* | (2006.01) |
| *G06K 9/03* | (2006.01) |
| *G06F 3/01* | (2006.01) |
| *G06F 3/038* | (2013.01) |
| *G06F 3/0484* | (2013.01) |

(Continued)

(52) U.S. Cl.
CPC ............. *G06K 9/033* (2013.01); *G06F 3/013* (2013.01); *G06F 3/038* (2013.01); *G06F 3/04842* (2013.01); *G06K 9/0061* (2013.01); *G06K 9/00335* (2013.01); *G06K 9/00597* (2013.01); *G06K 9/00604* (2013.01); *G06K 9/00617* (2013.01); *G06K 9/628* (2013.01);
(Continued)

(58) Field of Classification Search
None
See application file for complete search history.

(56) References Cited

U.S. PATENT DOCUMENTS

| | | | | |
|---|---|---|---|---|
| 2005/0281467 A1* | 12/2005 | Stahovich | .......... | G06K 9/00416 382/202 |
| 2008/0297587 A1* | 12/2008 | Kurtz | ................. | G06K 9/00335 348/14.08 |

(Continued)

FOREIGN PATENT DOCUMENTS

| | | |
|---|---|---|
| CN | 103324287 A | 9/2013 |
| WO | WO 2016/140628 A1 | 9/2016 |

OTHER PUBLICATIONS

Written Search Opinion for WO 2016/140628, dated Sep. 9, 2016, pp. 1-8, issued in International Application No. PCT/TR2015/000015, World Intellectual Property Organization, Date Accessed Aug. 3, 2018.*

International Search Report of the International Searching Authority, dated Nov. 4, 2015, pp. 1-4, issued in International Application No. PCT/TR2015/000015, European Patent Office, Munich, Germany.

(Continued)

*Primary Examiner* — Tahmina Ansari
(74) *Attorney, Agent, or Firm* — Brinks Gilson & Lione

(57) ABSTRACT

The present disclosure relates to a gaze based error recognition detection system that is intended to predict intention of the user to correct user drawn sketch misrecognitions through a multimodal computer based intelligent user interface. The present disclosure more particularly relates to a gaze based error recognition system comprising at least one computer, an eye tracker to capture natural eye gaze behavior during sketch based interaction, an interaction surface and a sketch based interface providing interpretation of user drawn sketches.

6 Claims, 3 Drawing Sheets

(51) Int. Cl.
_G06K 9/62_ (2006.01)
_G06F 3/0487_ (2013.01)

(52) U.S. Cl.
CPC ......... _G06K 9/6256_ (2013.01); _G06K 9/6269_
(2013.01); _G06F 3/0487_ (2013.01)

(56) References Cited

U.S. PATENT DOCUMENTS

| | | |
|---|---|---|
| 2014/0096077 A1 | 4/2014 | Jacob et al. |
| 2018/0025245 A1* | 1/2018 | Sezgin .................... G06F 3/013 382/103 |
| 2018/0114142 A1* | 4/2018 | Mueller .................. G06F 17/16 |

OTHER PUBLICATIONS

Written Opinion, dated Nov. 4, 2017, pp. 1-8, issued in International Application No. PCT/TR2015/000015, European Patent Office, Munich, Germany.

International Preliminary Report on Patentability, dated Feb. 23, 2017, pp. 1-5, issued in International Application No. PCT/TR2015/000015, European Patent Office, Munich, Germany.

Çig, Çağla, Sezgin, Tevfik Metin, "Gaze-based prediction of pen-based virtual interaction tasks," dated Sep. 28, 2014, pp. 91-106, Int. J. Human-Computer Studies 73 (2015) 91-106, © Elsevier 2014. XP055154831.

Bednarik, R., Vrzakova, H., Hradis, M., "What do you want to do next: A novel approach for intent prediction in gaze-based interaction," dated Jan. 1, 2012, pp. 83-90, ETRA Mar. 28-30, 2012, Santa Barbara, CA © 2012 ACM XP055223869.

* cited by examiner

SKETCH MISRECOGNITION CORRECTION SYSTEM BASED ON EYE GAZE MONITORING

PRIORITY

This application is a continuation of International Patent Application No. PCT/TR2015/000015 filed Mar. 5, 2015, which is herein incorporated by reference in its entirety.

TECHNICAL FIELD

The present disclosure relates to a gaze based error recognition detection system that predicts intention of a user to correct user drawn sketch misrecognitions through a multimodal computer based intelligent user interface.

BACKGROUND

Sketch based intelligent systems are becoming more popular as the pen-based devices gain popularity, appearing mostly in educational and design purpose applications. Sketch recognition is interpretation of user drawn sketches by a computer system in a way of segmenting user sketches into significant components and labeling each segment as an object. The interface provides recognition feedbacks on the label of each sketch segment by replacing sketch fragments with a recognized version of the intended object of the user.

SUMMARY

A system that aims to offer help with the correction of a misrecognition must first detect misrecognitions. State of the art systems may detect sketch misrecognitions only after the user takes action to correct them. The misrecognition is detected after the user takes action of correction and the misrecognized object is conventionally corrected by remaking of the sketch or by following another step to acquire the correct sketch recognition feedback. However, the reaction of the user towards the sketch recognition feedback can assist for the detection of the misrecognition occurrence.

Gaze based interaction to predict the intention of the user has been a long standing challenge in eye-tracking research. Users display distinctive gaze behaviors when the contextual consistency of the scene is disturbed. However, using gaze behavior as an only input leads to the 'Midas-Touch' problem which is a theme in eye tracking research that causes the interface to activate a command wherever the user looked at even though no intention of action is intended.

Gaze based interaction systems may be divided into two categories as command and non-command interfaces. Command interfaces use eye gaze as a computer input such as a mouse pointer technique. Systems are built using eye gaze for i.e. object selection, object moving and typing. However, this type of interaction causes Midas touch problem affecting the accuracy of gaze as a pointer input. Additionally, command interfaces force the user to manipulate their gaze in an unnatural manner leading to a high cognitive workload.

Non-command interfaces, on the other hand are based on the computer system and continuously observing the aspects of eye gaze behavior in its natural flow and providing corresponding responses. Non-command interfaces coincide with the approach for inferring intention of the user for correcting sketch misrecognition.

Natural gaze based interaction assists for modeling and recognizing the activity of the user. Activity recognition research consists of two branches being in real word or in virtual world (computer screen). Real world activities conventionally consist of daily tasks with hand-eye coordination. Virtual activities on the other hand are performed through a computer by minimal physical activity limited only to moving fingers and eyes.

Machine learning framework (MLF) is one way to predict the interaction intention of the user, to differentiate correction intending gaze behavior. Machine learning framework forms a computational structure which describes a connection between eye movement data and behavioral events. To infer the interaction intentions of the user from eye gaze data, appropriate approaches and features are needed which lead to correct intention prediction. Conventionally, feature sets are built from fixation and saccadic movements of the eye. A fixation relates to pausing of eye gaze at a certain location and saccade is a term used for a rapid eye movement between two fixations.

Due to the lack of standardization in eye-tracking, the best describing features often depend on observations and psychological research. The types of features are based on position and duration of the eye gaze and its movements. However, natural gaze behavior is complex and determined by many various parameters. Gaze trajectories are one of the important parameters to understand the initiation of the act of correcting sketch misrecognitions. In case of misrecognition the eye gaze of the user comes back directly on the object and stays fixed on it until it is marked. A double take action of the eye may occur after the first fixation to the misrecognition before marking it as misrecognition. It may also occur that users make fixations to other related sketch recognitions until they mark the misrecognition on the screen.

Human visual field is another important parameter affecting the sketch misrecognition. Human visual field is divided into three parts as foveal area being the center of the visual field, peripheral area of the eye which is the most outer part of the visual area, and parafoveal area being the transition field between foveal and peripheral area of the eye effecting the quality of the vision from inner visual field of the eye to the outer field.

The gaze based systems typically require an eye tracker, a user interface, a pen surface and a separate control apparatus such as a mouse or a pen to interact with the user interface of the system. User typically uses a selection tool to select objects on the display. The control apparatus serves also for modification and control of the selected objects such as hand drawing and for selection of choices presented on the display.

Sketch based intelligent interfaces with pen based hardware are widespread. These interfaces make use of sketch recognition technology to facilitate natural and efficient interaction. Nevertheless all sketch recognition systems suffer from misrecognitions, which inflict a correction cost on to the user. Every time a symbol gets misrecognized, the user explicitly or implicitly signals his intention to correct the error, and does so by either redrawing the symbol or selecting it from a list of alternatives. The present disclosure proposes a system for alleviating the cost of this two-step process by detecting users' intention to fix misrecognitions based on their eye gaze activity. In particular, users' natural reaction to misrecognitions manifests itself in the form of characteristic eye gaze movement patterns. Furthermore, these patterns can be used to read users' intention to fix errors before they initiate such action.

A prior art publication in the technical field of the present disclosure may be referred to as CN103324287, which describes, for example, an electronic painting method based on multi-media user interaction, which comprises the steps: (1) painting content consists of strokes drawn by using an electronic paintbrush and painting elements extracted from pictures; (2) a user searches candidate picture galleries from a picture material library by voice, static gestures or dynamic physical performances; (3) the user chooses pictures from the candidate picture galleries by the voice, static gestures or eye tracking; (4) the pictures chosen by the user are automatically segmented so that meaningful elements in the picture are extracted; element drawings needed by the user are chosen from the segmented results by distinguishing the voice and the static gestures of the user or the eye tracking; and (5) the user adjusts the size, angle and position of each drawing element by static gestures or voices to ensure beautiful paintings. The disclosed electronic painting way which is based on the voice, the static gestures or the dynamic physical performances of the user ensures a more humanized painting process.

The present disclosure provides that if the feedback of the recognition module is false, as users first have to erase the sketch and then remake it, the fact that the sketch recognition feedback is false is detectable between the feedback's occurrence and the time users erase it.

An interesting feature of the system is to provide an eye gaze based error detection system predicting the intention of the user to correct sketch misrecognitions on a sketch based interface before the intended correction action is taken.

Sketch recognition is the segmentation and interpretation of sketches by the computer in a human-like manner. Unlike plain pen-based interfaces, which see pen input merely as a collection of ink coordinates, sketch-based intelligent interfaces are able to interpret hand-drawn sketches. A sketch-based intelligent interface segments user sketches into meaningful pieces and labels each segment as an object. For example, in a sketch-based intelligent circuit simulator, the interface receives electrical circuit diagrams as input, segments the sketch into circuit elements and labels each segment. The recognition results can then be fed to an off the shelf circuit simulator to display circuit behavior. The interface provides the users with recognition feedback on the label of each sketch segment. Sketch-based interfaces employ a variety of feedback strategies to indicate recognition results. The most common strategy is replacing sketch fragments with a recognized version of the intended object.

Sketch misrecognition is the incorrect labeling of a sketch segment, such as labeling the capacitor element on the circuit diagram sketch as a battery. In current sketch recognition systems the user generally handles these misrecognitions by erasing the misrecognition feedback and remaking the sketch or taking any other step to acquire correct sketch recognition feedback. These extra steps cause waste of time and impact efficiency.

According to the present disclosure, a set of gaze-based features, which were designed to capture qualitative characteristics of users' eye gaze behavior are used. The eye gaze based error prediction system may provide an interface with sketch recognition technology to facilitate natural and efficient interaction through eye gaze behavior of the user.

Natural reactions of users to misrecognition display itself as characteristic eye gaze trajectory patterns and these patterns are used to interpret the intention of the user to correct errors before initiation of such action.

The disclosure therefore relates to a method and system and device to predict intention of user to correct sketch misrecognitions by a set of gaze based features designed to capture qualitative characteristics of eye gaze behavior of the user.

A framework to recognize intention of the user to correct errors with at least 85 to 90% prediction accuracy is described.

BRIEF DESCRIPTION OF THE FIGURES

Accompanying drawings are given solely for the purpose of exemplifying an eye gaze based error recognition detection system, whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure in the description.

DETAILED DESCRIPTION

Figure 1:
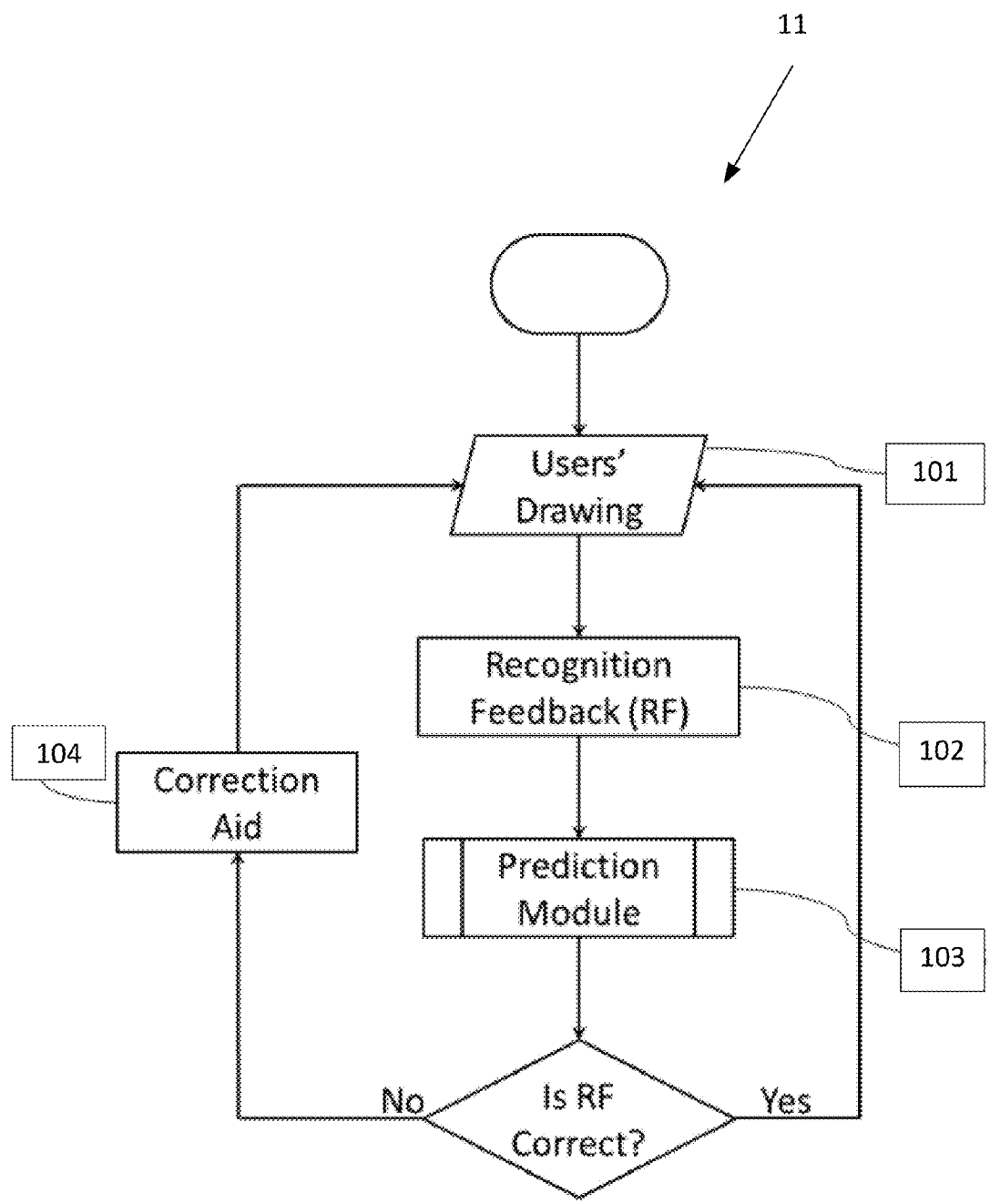
FIG. 1 demonstrates a general diagram view of an example error recognition detection system workflow within a gaze based error recognition system.
Figure 2:
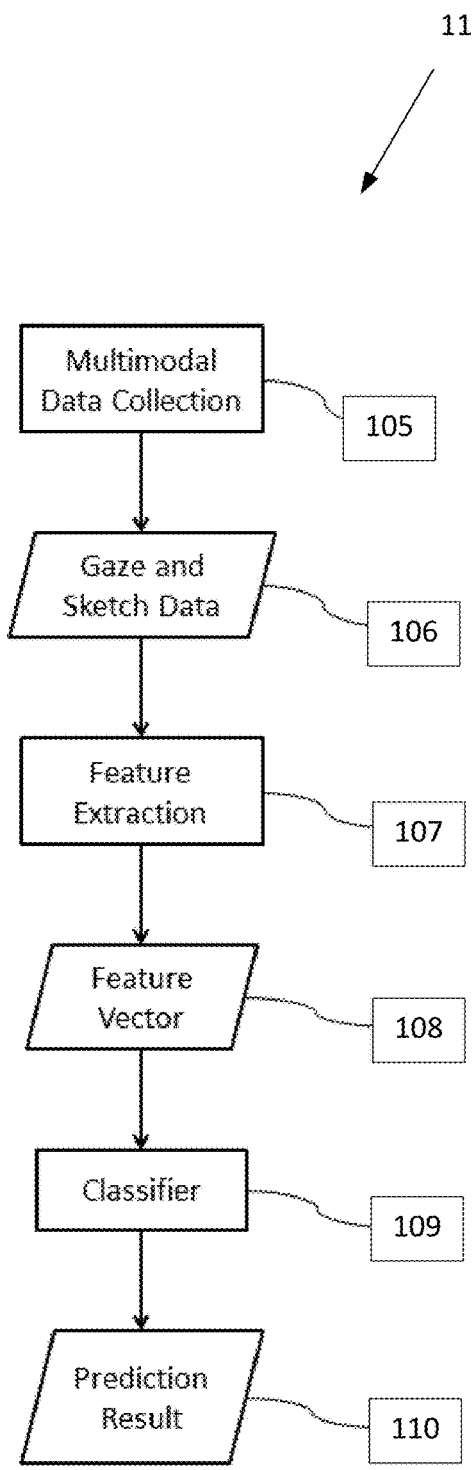
FIG. 2 demonstrates a general diagram view of an example prediction module workflow within the gaze based error recognition system.

The following numerals are referred to in the detailed description:
Gaze based error prediction system (11)
Sketch-based interface (12)
Eye tracker (13)
Interaction surface (14)
Computer (15)
Cursor device (16)
Further, the following modules and/or steps are defined in the present detailed description:
Users' drawing (101)
Recognition feedback (102)
Prediction module (103)
Correction aid module (104)
Data collection module (105)
Gaze and sketch data (106)
Feature extraction module (107)
Feature vector (108)
Classifier (109)
Prediction result (110)

Figure 3:
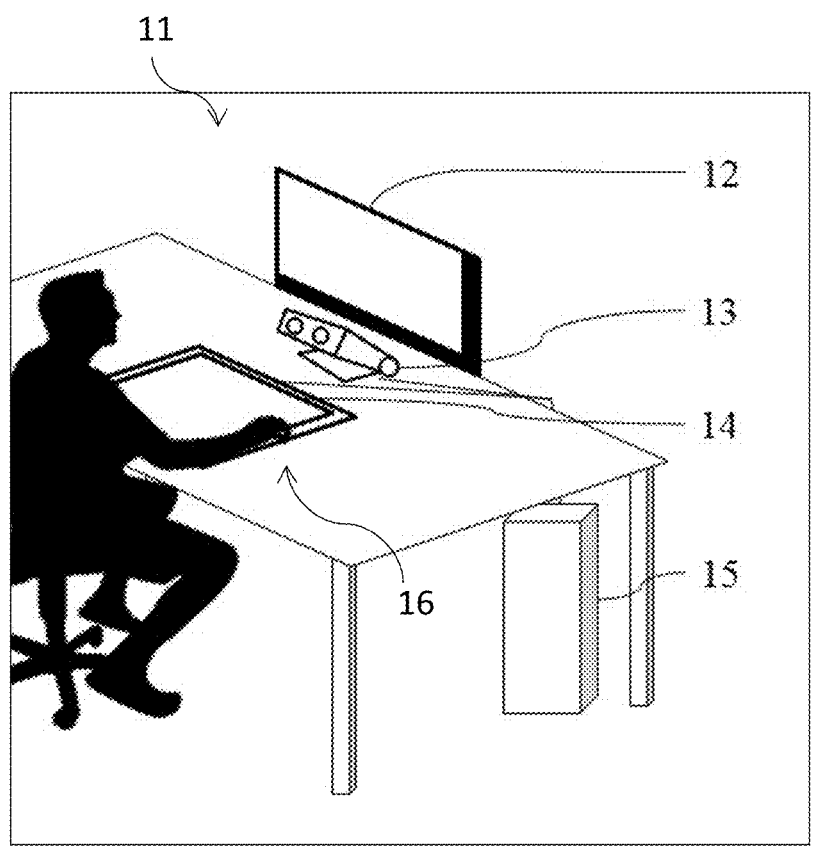
FIG. 3 demonstrates a general view of an example sketch based multimodal intelligent user interface set up of the gaze based error recognition system.

Referring to FIGS. 1-4, the present disclosure proposes a gaze based error prediction system (11) to infer the task that is intended to be performed by the user on a sketch based multimodal interaction user interface, comprising at least one computer (15), an eye tracker (13) to capture natural eye gaze behavior during sketch based interaction, an interaction surface (14) preferably in the form of a pen surface and a sketch based interface (12) providing interpretation of user drawn sketches. FIG. 3 shows the schematic of the device design including the components. An additional cursor device (16) can be used to provide interaction with the computer (15) while the users make their sketches.

Gaze based error prediction system (11) may include an information technology capability terminal having a display such as a laptop, tablet computer or any device capable of processing information in the technical context of the present disclosure. The gaze data is conventionally collected by the eye tracker (13) and the characteristic eye movement features are extracted. Eye trackers (13) are commercially available and as such are widely known to the skilled worker. They are sold in the market under different trade names such as for instance Tobii.

Gaze based error prediction system (11) primarily collects sketch and gaze data during pen based interaction tasks within a sketch-based interaction system to build a multimodal database in order to assess the eye gaze behavioral changes in reaction to sketch misrecognitions. The extracted features from the collected data build the prediction model using machine learning framework.

The gaze based error prediction system (11) consists of a prediction module (103) and correction aid module (104). The sketch recognition system provides the user with recognition feedback (102) for the corresponding drawing and the prediction module (103) processes the collected gaze data to conclude whether the provided recognition feedback (102) is correct.

The prediction module (103) with the sketch recognition feedback (102) collects real time synchronized gaze and sketch data (106) through multimodal data collection module (105). A feature extraction module (107) extracts features representing gaze patterns of sketch misrecognition correction intention of the user. Feature vector (108) produced from feature extraction module (107) is forwarded to a classifier (109) to provide a prediction result (110). Classifier (109) consists of pre- trained machine learning algorithm and decides about the accuracy of the recognition feedback (102). In the case (109) the classifier concludes that the recognition feedback (102) is correct, the interface takes no action and user continues to the drawings. However in the case the recognition feedback (102) is not correct, the correction aid module (104) gets activated and replaces the recognition feedback (102) with the next most probable feedback or presents suggestions to the user for correction of the misrecognition. The suggestions include a drop-down menu or animation of possible feedbacks. Machine learning framework is built after feature vectors are created. Support Vector Machines (SVM) that analyze data and recognize patterns with radial basis kernel function are used.

The classification accuracy of the machine learning framework is built from designed features of gaze behavior to distinguish the correction intending fixations from general purpose fixations of the eye to sketch recognitions. The designed set of features are categorized based on duration, frequency, distance and timing of fixations and corrections.

It is found that there are three distinctive gaze behaviors common among all users prior to the initiation of the act of correcting sketch misrecognitions:
  i) Direct Comeback: Users' gaze comes back directly to the misrecognition and stays on until they mark it.
  ii) Double Take: Users do a double take after the first fixation to the misrecognition before they mark it as a misrecognition.
  iii) Investigation: Users make fixations to other related sketch recognitions until they mark the misrecognition.

The collected gaze data is segmented into fixations and saccades by the multimodal data collection module (105). Fixations are characterized by the lower speed of gaze compared to saccades. Therefore, acceleration and velocity of eye gaze are considered as decisive features for differentiating fixations from saccades. Successive fixations that are closer to each other than 1° are not taken into account, since during these fixations there are no changes to users' foveal area)(1°-2°). Further, visits are defined in the following manner: A visit to an object starts when the gaze enters and ends when the gaze exits the objects' area. Visits can contain multiple successive fixations on an object.

According to the disclosure, all gaze movements are analyzed starting from the occurrence of sketch recognition (stimulus) until the fixation to this sketch recognition. It is established that people fixated longer to changes on a scene. Therefore, features based on fixation duration such as duration of the last fixation, mean duration of fixations, duration of the last visit, and mean duration of visits are defined.

These four parameters' relative importance significance is based on the differences at the empirical cumulative probability distributions. Processing of empirical cumulative probability distributions for each feature for correction intending and general purpose fixation classes and comparison of distributions from both classes, probability distributions for correction intending and general purpose fixation classes are obtained for each feature. To measure the significance of differences between distributions Kolmogorov-Smirnov (KS) test is applied, a test known to the skilled worker, widely used to determine if two empirical cumulative probability distributions are significantly different. It takes the maximum value of difference between two distributions and checks this value for significance. The test is originally designed for continuous values. However there are extensions for distributions of discrete values (C. L. Wood and M. M. Altavela, "Large-sample results for Kolmogorov-Smirnov statistics for discrete distributions," Biometrika, vol. 65, no. 1, pp. 235-239, 1978).

The fixation duration based features have significance on the classification accuracy prior to correction intending fixations than general purpose fixations because of user's eye gaze fixations in response to changes on a scene remaining a longer period. Fixation duration features are found to be the most informative and significant features ensuring classification accuracy.

Frequency features such as fixation frequency are also found to have an impact on significant increase in the classification accuracy and make a contribution to duration features. On the other hand, the distance features are found to provide no substantial contribution to the prediction accuracy. Therefore, the total duration of the gaze spent on sketch misrecognition has importance regardless of the distance of the fixations.

Fixation duration is the time period of looking at a certain point thus, the elapsed time on a certain point indicates a sign of attention to a particular object. Therefore, mean duration of fixation defines the difference in the interest between the misrecognition and recognition from eye gaze information of the user. Duration of the last fixation, on the other hand, as one of the most important fixation duration features, defines the time period of last fixation of the user's eye gaze to a misrecognition which is particularly different from the fixation to the correct sketch recognition.

Multiple successive fixations to the recognition feedback (102) are defined as a single visit. Mean duration of visits to the corresponding object is also important in measuring the attention of the user for the particular sketch recognition.

Duration of the last visit as another important parameter of the fixation duration features represents the period for the user giving the conclusion about the stimuli, therefore the last visit of the eye gaze on the particular sketch recognition enhances the prediction accuracy of the gaze based error prediction system (11).

The prediction module (103) consists of a feature extraction module (107) and a two-class classifier (109). The classifier (109) is built using machine learning (ML). In at least one embodiment, the ML algorithm used for the classifier (109) is support vector machines (SVM) with radial basis kernel function (RBF). The training data for the ML algorithm may be acquired by recording the gaze and sketch data of the users during sketch-based interaction. The said interaction may include drawing numbers and geometric shapes on an intelligent user interface. The interface recognizes sketches and gives feedback in the form of beautified objects.

The gaze data may be segmented into fixations. Each fixation to a correct sketch recognition feedback (102) on the interface is labeled as fixation with no intention to correct (FNIC). Fixations to sketch misrecognitions are labeled as fixation with intention to correct (FIC). Gaze and sketch data starting with the recognition feedback (102) and ending with the fixation itself is used for extracting features. Feature vectors extracted from the data prior to FICs are labeled as FIC. Feature vectors extracted from the data prior to the FNICs are labeled as FNICs. SVM with RBF kernel is trained with a training data set consisting of equal number of samples from FIC and FNIC classes. The number of samples from each class may be a certain number. The parameters for the SVM may be optimized with 5-fold cross validation, a process known to the skilled worker.

In a real-time system when the users make a fixation to a sketch recognition feedback (102), the gaze and sketch data from the time of the occurrence of the recognition until the fixation is given as input to the feature extraction module (104). The acquired feature vector (108) is then given to the trained ML model. The ML model, i.e. the classifier (109) makes a prediction depending on the feature values. According to the prediction result, the system gives the appropriate response to the user. If the prediction is that the sketch recognition feedback (102) is correct than the system does not give any response. In one embodiment, if the ML decides that the recognition feedback (102) is incorrect then the system may provide the user with a drop-down menu to choose the correct object from. In another embodiment, the system may animate other possible objects in the place of the incorrect sketch recognition (102). In another embodiment the system may directly replace the incorrect object with the second most probable object.

Human visual field is another important parameter affecting the sketch misrecognition. Human visual field is divided to three parts as foveal area being the center of the visual field, peripheral area of the eye which is the most outer part of the visual area, and parafoveal area being the transition field between foveal and peripheral area of the eye. The quality of vision decreases as visual field goes from foveal area to peripheral area. The visual field in which the sketch misrecognition is located has an impact on the classification accuracy. Sketch misrecognitions tend to be disregarded as the misrecognition moves from inner visual fields to outer visual fields.

Time required for the system to detect sketch misrecognitions affects the efficiency of user-computer interaction. The earlier the system detects sketch misrecognition prior to reaction of the user, the more efficient user-computer interaction becomes. Accuracy of more than 80% is ensured at 500 milliseconds before the correction or fixation end time. One second before the correction ensures 77.7% classification accuracy, therefore the system provides more than 75% accuracy one second before the user initiates an action.

In accordance with the present disclosure, the visual information is provided as a color bar on the display that appears green as long as the eye tracker (13) is able to collect valid data and turns to red color when the data is undependable in cases such as the eye tracker (13) is not positioned in a correct manner and said eye tracker (13) loses the contact with the eyes of the user. Additionally, a probing sound added to the system provides extra notice for the user in the case the gaze data is invalid for more than one second.

The calibration method may require the user to perform a set of virtual interaction tasks prior to the initial use of the gaze based error prediction system (11) to collect gaze information from the user through the eye tracker (13).

In a nutshell, an aspect proposes a gaze based error recognition system (11) comprising at least one computer (15), an eye tracker (13) to capture natural eye gaze behavior during sketch based interaction, an interaction surface (14) and a sketch-based interface (12) providing interpretation of user drawn sketches.

In one aspect, a recognition feedback (102) is provided by said gaze based error prediction system (11) and a prediction module (103) of said sketch based interface (12) collects real-time synchronized user gaze data and sketch data in relation to said interaction surface (14) to extract characteristic features of user eye movement in the form of eye movement feature parameters captured through said eye tracker (13) during a sketch drawing process.

In a further aspect, said prediction module (103) distinguishes correction intending eye fixations from general purpose eye fixations to recognition feedback (102) according to the eye movement features in the manner that all gaze movements are analyzed starting from the occurrence of said recognition feedback (102), In a further aspect, the prediction module (103) processes the collected gaze data to conclude whether the provided recognition feedback (102) is correct based on said eye movement features in the manner that the prediction module (103) supplies a prediction result (110). Preferably, the prediction module (103) supplies a prediction result (110) no later than 5000 milliseconds starting from the occurrence of said recognition feedback (102) and/or 1000 milliseconds before the users' correction.

In a further aspect, the prediction module (103) comprises a feature extraction module (107) acquiring a feature vector (108) based on the gaze and sketch data (106) from the time of the occurrence of the recognition feedback (102) until the user makes a fixation to the sketch recognition feedback (102).

In a further aspect, the prediction module (103) comprises a two-class classifier (109) built using machine learning (ML).

In a further aspect, the ML algorithm used for the classifier (109) is support vector machines (SVM) with radial basis kernel function (RBF).

In a further aspect, training data for the ML algorithm is acquired by recording the gaze and sketch data (106) of users during sketch-based interaction.

In a further aspect, the SVM with RBF kernel is trained with a training data set consisting of equal number of samples of fixations labeled as fixation with no intention to correct (FNIC) to a correct sketch recognition feedback (102) and fixations labeled as fixation with intention to correct (FIC) to sketch misrecognitions.

In a further aspect, SVM parameters are optimized with 5-fold cross validation.

In a further aspect, the two-class classifier (109) makes a prediction depending on the feature values of the feature vector (108) acquired by the feature extraction module (104).

In a further aspect, if the prediction module (103) concludes that the sketch recognition feedback (102) is incorrect, then the gaze based error recognition system (11) provides the user with alternative sketches to choose the correct object from.

In a further aspect, the gaze based error recognition system (11) directly replaces the incorrect object with the second most probable object.

In a further aspect, the feature vector (108) comprises a feature defined as the duration of last fixation to the recognition feedback (102).

In a further aspect, the feature vector (108) comprises a feature defined as the duration of last visit to the recognition feedback (102).

In a further aspect, the feature vector (108) comprises a feature defined as the mean duration of fixations.

In a further aspect, the feature vector (108) comprises a feature defined as the mean duration of visits.

Further, a method for operating a gaze based error recognition system (11) is proposed. Said method comprising the steps of: a) providing interpretation of user drawn sketches by a sketch-based interface (12) starting from supply of a recognition feedback (102) by the gaze based error prediction system (11), b) simultaneously collecting real-time synchronized sketch and gaze data during sketch based interaction tasks within the sketch-based interface (12), capturing natural eye gaze behavior of a user by means of an eye tracker (13) during sketch based interaction on an interaction surface (14), c) extracting eye movement features of duration of the last fixation, mean duration of fixations, duration of the last visit and mean duration of visits, representing gaze patterns of sketch misrecognition correction intention of the user and, d) distinguishing correction intending eye fixations from general purpose eye fixations to recognition feedback (102) according to the eye movement feature in the manner that the prediction module (103) supplies a prediction result (110).

The subject-matter of the disclosure may also relate, among others, to the following aspects:

1) A gaze based error recognition system (11) comprising at least one computer (15), an interaction surface (14) and an eye tracker (13) to capture natural eye gaze behavior during sketch based interaction on said interaction surface (14) and a sketch-based interface (12) configured to provide a recognition feedback (102) whereby user drawn sketches on said interaction surface (14) are interpreted, wherein;

said sketch based interface (12) comprises a prediction module (103);

said prediction module (103) comprises a multimodal data collection module (105) configured to collect real-time synchronized user gaze data, captured by said eye tracker (13) and sketch data (106) in relation to said interaction surface (14) and to segment said collected gaze data into fixations and saccades;

said prediction module (103) comprises a feature extraction module (107) configured to determine, from said fixations of the segmented gaze data the characteristic features of user eye movement in the form of duration of last fixation to the recognition feedback (102), duration of last visit to the recognition feedback (102), mean duration of fixations and mean duration of visits;

said prediction module (103) comprises a two-class classifier (109) configured to effect classification of the gaze data into correction intending and general purpose fixation classes according to the values of their characteristic features and, to provide a prediction result (110) as to whether said recognition feedback (102) is correct or not based on the class assigned by said classifier (109), and wherein said classifier (109) consists of a machine learning algorithm and training data for said machine learning algorithm consists of the gaze data and sketch data (106) of users recorded during sketch-based interaction.

2) A gaze based error recognition system (11) as set forth in aspect 1, characterized in that the machine learning algorithm used for said classifier (109) is support vector machines (SVM) with radial basis kernel function (RBF).

3) A gaze based error recognition system (11) as set forth in aspect 2, characterized in that the training data for said support vector machines (SVM) with radial basis kernel function (RBF) consist of equal number of samples of fixations labelled as fixation with no intention to correct (FNIC) for a correct sketch recognition feedback (102) or fixation with intention to correct (FIC) for sketch misrecognitions.

4) A gaze based error recognition system (11) as set forth in aspect 2 or 3, characterized in that the optimization of support vector machines (SVM) parameters consist of 5-fold cross validation.

5) A gaze based error recognition system (11) as set forth in any preceding aspect, characterized in that said gaze based error recognition system (11) comprises a correction aid module (104) such that if the prediction module (103) determines that the sketch recognition feedback (102) is incorrect, then the gaze based error recognition system (11) provides the user with alternative sketches to choose the correct object from and/or directly replaces the incorrect recognition feedback (102) by the second most probable object.

6) A method for operating a gaze based error recognition system (11) as defined in aspect 1, said method comprising the steps of:
  a) performing sketch-based user interaction on the interaction surface (14) to draw sketches;
  b) capturing, with the eye tracker (13), natural eye gaze behavior during the sketch-based interaction on the interaction surface (14);
  c) providing, with the sketch-based interface (12), a recognition feedback (102) whereby user drawn sketches on said interaction surface (14) are interpreted;
  d) collecting, with the multimodal data collection module (105), real-time synchronized user gaze data, captured by the eye tracker (13), and sketch data (106) in relation to said interaction surface (14);
  e) segmenting, with the multimodal data collection module (105), said collected gaze data into fixations and saccades;
  f) determining, with the feature extraction module (107), the characteristic features of the gaze data from the fixations of the segmented gaze data, wherein the characteristic features are in the form of duration of last fixation to the recognition feedback (102), duration of last visit to the recognition feedback (102), mean duration of fixations and mean duration of visits;
  g) effecting, via the classifier (109), classification of the gaze data into correction intending and general purpose fixation classes according to the values of their characteristic features, and
  h) providing, via said classifier (109), a prediction result (110) as to whether said recognition feedback (102) is correct or not based on the class assigned by said classifier (109).

The gaze based error recognition system 11 may be implemented with additional, different, or fewer components or modules than illustrated. For example, the system 11 may include a memory and a processor.

The processor may be in communication with the memory. In one example, the processor may also be in communication with additional elements, such as a network interface (not shown). Examples of the processor may include a general processor, a central processing unit, a microcontroller, a server, an application specific integrated circuit (ASIC), a digital signal processor, a field programmable gate array (FPGA), and/or a digital circuit, analog circuit.

The processor may be one or more devices operable to execute logic. The logic may include computer executable instructions or computer code embodied in the memory or in other memory that when executed by the processor, cause the processor to perform the features implemented by the logic of the address obtaining module, the video streaming module, the determining module, the adding module, and/or the deletion module. The computer code may include instructions executable with the processor.

The memory may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device. The memory may include all or a portion of at least one of the Users' drawing (101), Recognition feedback (102), the Prediction module (103), the Correction aid module (104), the Data collection module (105), the Gaze and sketch data (106), the Feature extraction module (107), the Feature vector (108), the Classifier (109), and/or the Prediction result (110).

Each component may include additional, different, or fewer components. The system 11 may be implemented in many different ways. Each module, such as the Prediction module (103), the Correction aid module (104), the Data collection module (105), may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory, for example, that comprises instructions executable with the processor or other processor to implement one or more of the features of the module. When any one of the modules includes the portion of the memory that comprises instructions executable with the processor, the module may or may not include the processor. In some examples, each module may just be the portion of the memory or other physical memory that comprises instructions executable with the processor or other processor to implement the features of the corresponding module without the module including any other hardware. Because each module includes at least some hardware even when the included hardware comprises software, each module may be interchangeably referred to as a hardware module.

At least some features are stored in a computer readable storage medium (for example, as logic implemented as computer executable instructions or as data structures in memory). All or part of the system 11 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable storage medium, such as a CD-ROM, a volatile memory, a non-volatile memory, ROM, RAM, or any other suitable storage device.

The processing capability of the system 11 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. In addition, the use of the article "a" in the claims is equivalent to "one or more."

While various embodiments have been described, it will be apparent to those of ordinary skill in the art that many more embodiments and implementations are possible. Accordingly, the embodiments described herein are examples, not the only possible embodiments and implementations.

The invention claimed is:

1. A gaze based error recognition system comprising: at least one computer, an interaction surface, an eye tracker to capture natural eye gaze behavior during sketch based interaction on said interaction surface, and a sketch-based interface configured to provide a recognition feedback to interpret user drawn sketches on said interaction surface, wherein;

said sketch based interface comprises a prediction module;

said prediction module comprises a multimodal data collection module configured to collect real-time synchronized user gaze data, captured by said eye tracker and sketch data in relation to said interaction surface and to segment said collected gaze data into fixations and saccades;

said prediction module comprising a feature extraction module configured to determine, from said fixations of the segmented gaze data, characteristic features of user eye movement in a form of duration of last fixation to the recognition feedback, duration of last visit to the recognition feedback, mean duration of fixations and mean duration of visits;

said prediction module comprises a two-class classifier configured to effect classification of the gaze data into correction intending and general purpose fixation classes according to the values of their characteristic features; and to provide a prediction result as to whether said recognition feedback is correct or not based on the class assigned by said classifier, and wherein said classifier consists of a machine learning algorithm and training data for said machine learning algorithm consists of the gaze data and sketch data of users recorded during sketch-based interaction.

2. The gaze based error recognition system as set forth in claim 1, wherein the machine learning algorithm used for said classifier is support vector machines (SVM) with radial basis kernel function (RBF).

3. The gaze based error recognition system as set forth in claim 2, wherein training data for said support vector machines (SVM) with radial basis kernel function (RBF) comprises an equal number of samples of fixations labelled as fixation with no intention to correct (FNIC) for a correct sketch recognition feedback or fixation with intention to correct (FIC) for sketch misrecognitions.

4. The gaze based error recognition system as set forth in claim 2, wherein the optimization of support vector machines (SVM) parameters consist of 5-fold cross validation.

5. The gaze based error recognition system as set forth in claim 1, wherein said gaze based error recognition system comprises a correction aid module such that if the prediction module determines that the sketch recognition feedback is incorrect, then the gaze based error recognition system is configured to one of provide a user with alternative sketches to choose the correct object from or directly replace the incorrect recognition feedback by the second most probable object.

6. A method for operating a gaze based error recognition system comprising:

performing sketch-based user interaction on an interaction surface to draw sketches;

capturing, with an eye tracker, natural eye gaze behavior during the sketch-based interaction on the interaction surface;

providing, with a sketch-based interface, a recognition feedback based on interpretation of user drawn sketches on said interaction surface;

collecting, with a multimodal data collection module, real-time synchronized user gaze data, captured by the eye tracker, and sketch data in relation to said interaction surface;

segmenting, with the multimodal data collection module, said collected gaze data into fixations of segmented gaze data and saccades;

determining, with a feature extraction module, characteristic features of the gaze data from the fixations of the segmented gaze data, wherein the characteristic features are in a form of duration of last fixation to a recognition feedback, duration of last visit to the recognition feedback, mean duration of fixations of segmented gaze data, and mean duration of visits;

effecting, via a classifier, classification of the gaze data into correction intending classes and general purpose fixation classes according to values of their characteristic features, and providing, via said classifier, a prediction result as to whether said recognition feedback is correct or not based on the class assigned by said classifier.

* * * * *